United States Patent [19]

Plangetis

[11] Patent Number: 5,368,344
[45] Date of Patent: Nov. 29, 1994

[54] COUPLING STUD ASSEMBLY

[75] Inventor: Gus F. Plangetis, Annapolis, Md.

[73] Assignee: The United States of America as represented by the Secretary of the Navy, Washington, D.C.

[21] Appl. No.: 125,712

[22] Filed: Sep. 24, 1993

[51] Int. Cl.5 ............................................ F16L 23/02
[52] U.S. Cl. .................................. 285/412; 285/421; 411/385; 29/428
[58] Field of Search ............... 285/421, 405, 412, 363, 285/368; 411/55, 78, 79, 80, 385; 29/428

[56] References Cited

U.S. PATENT DOCUMENTS

| | | | |
|---|---|---|---|
| 525,775 | 9/1894 | Wainwright | 285/421 X |
| 612,731 | 10/1898 | Jones | 411/385 |
| 789,222 | 5/1905 | Lovekin | 285/412 |
| 1,692,798 | 11/1928 | Potter | 285/421 X |
| 3,204,514 | 9/1965 | Sauvet | 411/385 |
| 4,572,548 | 2/1986 | Porowski et al. | 285/421 X |

Primary Examiner—Dave W. Arola
Attorney, Agent, or Firm—Gary G. Borda

[57] ABSTRACT

A coupling stud assembly for coupling together a pair of flanges. A stud having a tapered surface is inserted into respective overlapping through-holes provided in the flanges so that a space is defined between the stud and inner walls of the holes. A wedge is fitted into the space and is pressed by a wedge spacer so as to tighten contact between the stud and the inner walls of the through-holes. Nuts are provided on threaded ends of the stud to securely couple the flanges together. This arrangement provides a tight, vibration-free coupling between the flanges.

15 Claims, 6 Drawing Sheets

COUPLING STUD ASSEMBLY

BACKGROUND OF THE INVENTION

1. Field of the Invention

The present invention relates to a coupling stud assembly for coupling together a pair of flanges. More particularly, the present invention relates to a coupling stud assembly for coupling together shafts, such as propeller shafts of merchant ships, power plants and generally high-horsepower transmission shafts having multiple sections.

2. Description of the Prior Art

Figure 1:
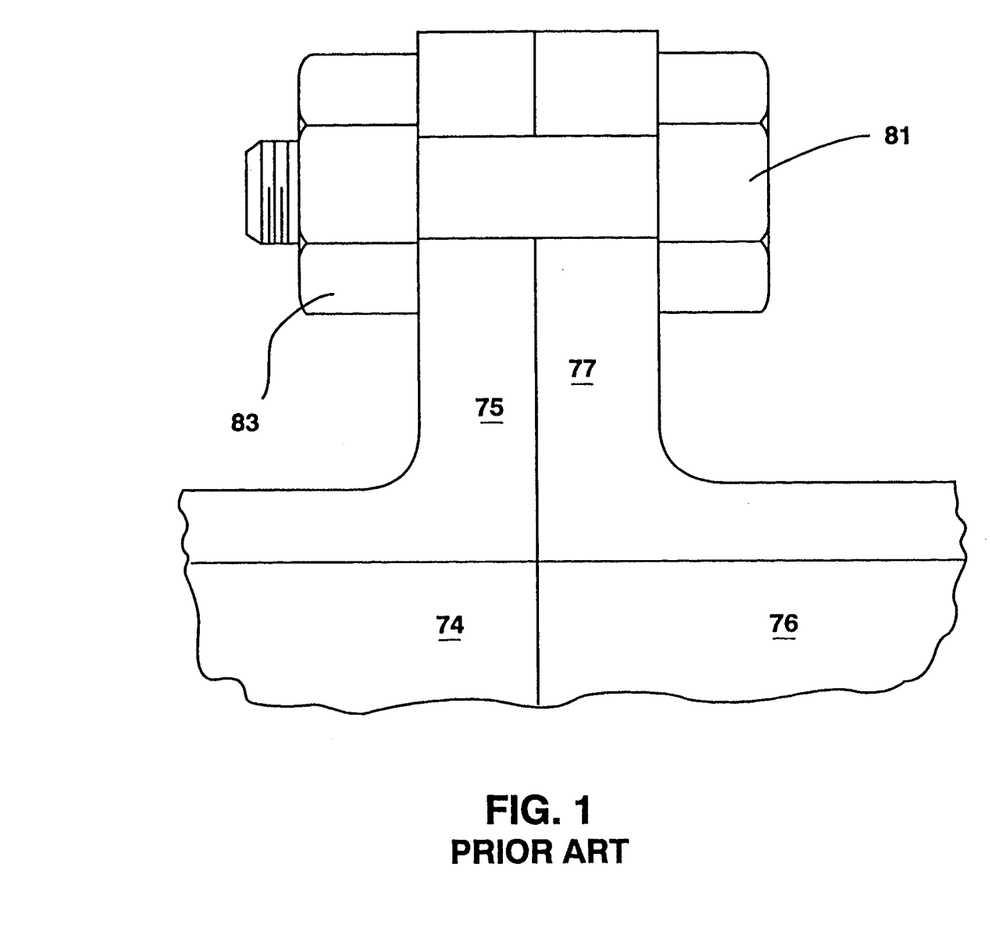
FIG. 1 is a cross-sectional view of a prior art coupling device.

It is presently known to use a stud (also called a bolt) and a nut that is straight over its length, to couple together a pair of flanges that are attached to respective shafts, such as an output shaft and a drive or transmission shaft. Depending on the application, these flanges may include: a) an integral part of the shaft, wherein the flanges are machined out of the same stock material as the shaft; or b) one flange made of two halved collar pieces, a coupling sleeve and two keys for mating with the shaft, and an integral flange end for the other mating flange. The latter configuration is used in designs where openings for receiving shafts are to be minimized, such as for propeller shafts. For ease of illustration "the integral flange" concept, as shown in FIG. 1, will be discussed herein. FIG. 1 presents a prior art coupling device for connecting a high torque transmission shaft 74 to an output shaft 76 where both flanges, 75 and 77, are an integral part of the shaft 74 and 76, respectively. For clarity only one bolt and one nut is shown even though they are a plurality located circumferentially around the flange. Flanges 75 and 77 have perpendicular mating surfaces with respect to the center line of their respective shafts. This prior art coupling device includes bolt 81 for receiving nut 83 as the means of "coupling together" the two shafts.

In the coupling device of FIG. 1, a number of equidistant circumferentially spaced holes are drilled around flange 75 and 77 so that bolts 81 may pass through the two flanges to couple together the two shafts. A predetermined torque is applied evenly to all the bolts. The torque depends on the mechanical and physical characteristics of the coupling design. These design characteristics are mainly dictated by the torque to be transmitted.

It has, however, been found that it is very difficult to maintain proper tightening and many times nuts become loosened after a short period of service. Such loosening, which is primarily attributed to vibration, causes an unbalanced load distribution on the bolts and may cause the bolts to shear. In addition, the tightening torque applied to the bolt causes slight shrinkage in the bolt diameter, thereby causing a lesser contact area between the holes in the flange and the bolt itself. Consequently, relative flange slippage can occur over time, resulting in loosening of the nuts. Slippage between flanges may result in additional vibration, and may cause the bolts to shear. Such coupling arrangements are well known to persons skilled in the art and, therefore, will not be discussed further.

Generally, a good coupling device prevents slippage at the interface of the flanges and transmits driving torque smoothly between the coupled shafts with reduced levels of vibration. Therefore, an appropriate coupling between shafts is one that transmits a driving torque with no relative movement between the coupled flanges and no loosening over time.

Another way to provide a coupling between two flanges is to have hollow studs. These hollow studs are first bolted down to a given tightness, and then are hydraulically pressurized so that the studs expand radially to make a tight contact with the inner walls of the holes formed through the flanges. The problem with this concept is that loss of hydraulic pressure may loosen the nuts.

Another known method for coupling is to use tapered holes and studs. When these studs are placed under an applied torque, it becomes very difficult to achieve proper tightening due to non-linear shrinkage of the studs and the anticipated partial expansion of the tapered flange hole. Proper mating between the tapered studs and tapered holes is very difficult to achieve and often requires machining to be performed it situ.

Another known method is to carefully machine protruding wedges between the contacting surfaces of the flanges, so that the wedges will interlock so as to prevent slippage. More friction is provided by rough surfaces, instead of smooth flat surfaces, at the interface of the flanges, thereby preventing slippage. When the coupling bolts are tighten properly the wedges interlock tightly. The main problem with this alternative is that it is very difficult to achieve shaft alignment, by having ideal wedge mating surfaces at the coupling interface.

SUMMARY OF THE INVENTION

Accordingly, there is a need for a coupling stud assembly that avoids the aforementioned problems in the prior art.

To solve these and other problems in the coupling devices of the prior art, and to provide a coupling stud assembly that maintains a tight, vibration-free coupling between a pair of flanges, it has now been discovered that wedging the stud in place inside the holes formed in the flanges prevents the stud from slipping within the holes. The stud may be pressed against the interior walls of the holes by means of a wedge that has a rounded side for engaging the inner walls of the holes and a flat side for engaging a corresponding flat side of the stud. Thus, the coupling stud assembly may eliminate the need to form round tapered through-holes, which are necessary for the prior art coupling devices. The wedge and the stud together may form a substantially cylindrical outer contour for fitting into generally circular through-holes of the flanges.

The general purpose of the coupling stud assembly is to provide better bolting means for coupling a pair of flanges. The coupling stud assembly transmits driving torque efficiently and smoothly between the respective shafts of the flanges. The coupling stud assembly has application in, for example, couplings for propeller shafts of merchant ships, power plants and generally, high-horsepower transmission shafts having multiple sections.

Accordingly, it is an object of the present invention to provide a coupling stud assembly for coupling a pair of flanges. The flanges may have a pair of respective overlapping generally cylindrical holes formed therein for receiving the stud assembly, the stud assembly including a stud and first retaining means for retaining the stud in the holes so as to couple the flanges; the stud being shaped and sized for defining a space between the stud and the inner walls of the holes; and at least one wedging member shaped and sized for fitting into the space between the stud and the inner walls of the holes so as to tighten contact between the stud and the inner walls of the respective overlapping holes of the flanges.

The present invention further includes a method for coupling a pair of flanges. According to a further aspect, the invention may comprise, in combination, a pair of shafts having respective flanges and the above-described coupling stud assembly.

Other features and advantages of the present invention will become apparent from the following description of the invention which refers to the accompanying drawings.

DETAILED DESCRIPTION OF PREFERRED EMBODIMENTS

Figure 2:
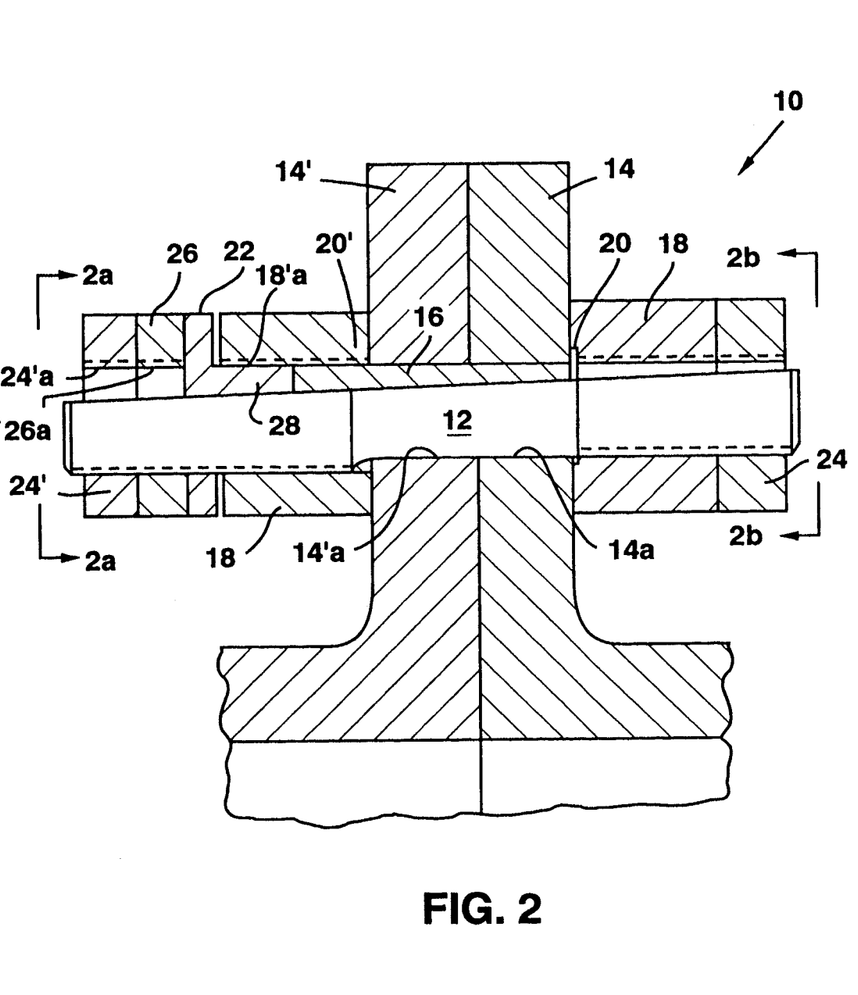
FIG. 2 is a cross-sectional view of a coupling stud assembly according to a first embodiment of the present invention.
Figure 2A:
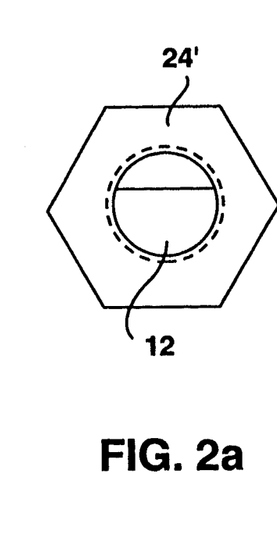
FIGS. 2a and 2b are respective end views along lines 2a—2a and 2b—2b of the coupling stud assembly of FIG. 2.
Figure 2B:
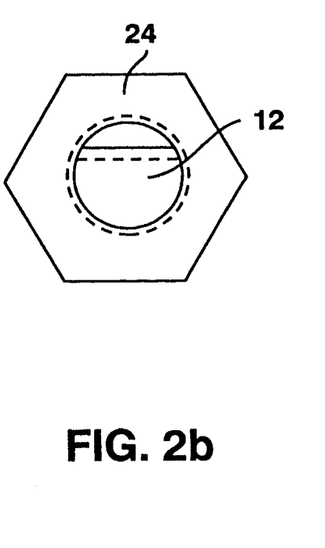
Figure 3:
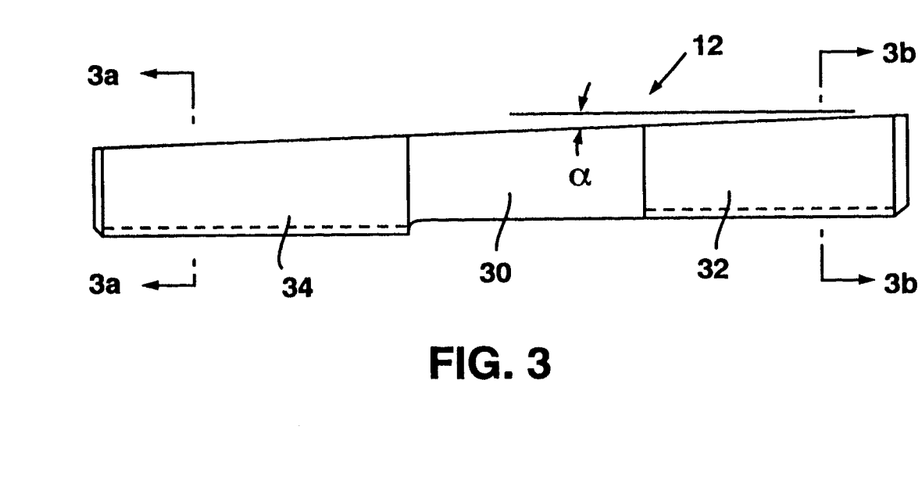
FIG. 3 is a perspective view of a stud of the embodiment in FIG. 2.
Figure 3A:
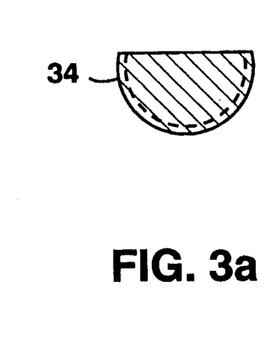
FIGS. 3a and 3b are cross-sectional views along lines 3a—3a and 3b—3b, respectively, of FIG. 3.
Figure 3B:
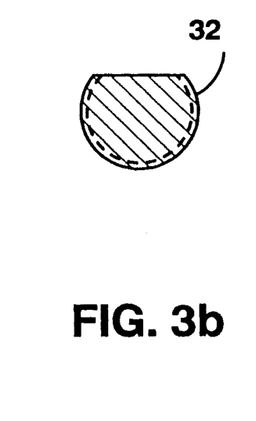
Figure 3C:
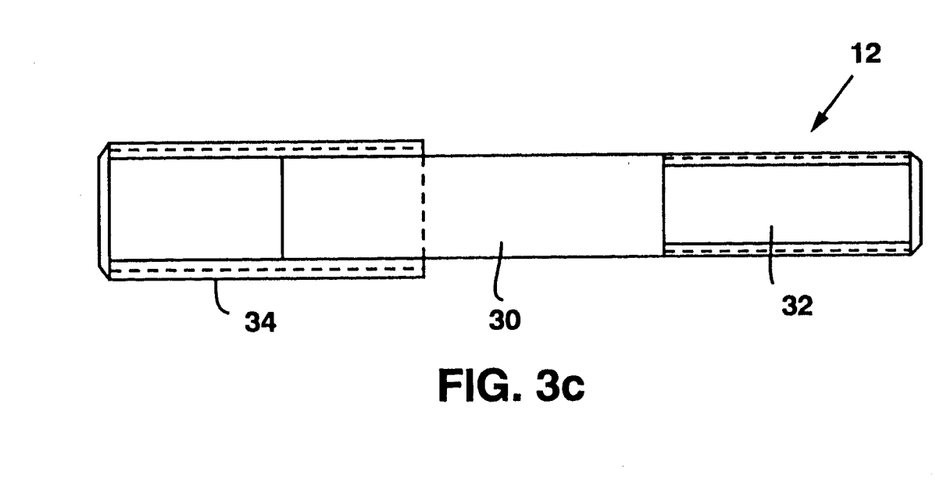
FIG. 3c is a top view of the stud of FIG. 3.

A first embodiment of the invention is shown in FIGS. 2–6. In FIG. 2, the coupling stud assembly 10 includes a stud 12 (also shown in FIGS. 3, 3a, and 3b and 3c) that has an upper tapered side with extended threaded ends. As shown in FIGS. 3, 3a, 3b and 3c, the stud 12 is generally cylindrical in shape with an upper side having a flat tapered surface. The taper on the upper side of the stud 12 can extend along a part of the length of the stud 12, as shown in FIGS. 2, 3 and 3c, or may extend along the entire length of the stud 12, depending on the angle of the taper, number of studs required, and other space and design characteristics of the stud 12.

Figure 4:
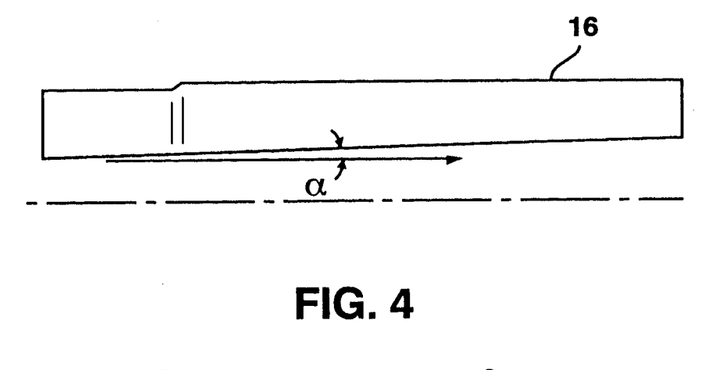
FIG. 4 is a perspective view of a wedge of the embodiment in FIG. 2.
Figure 4A:
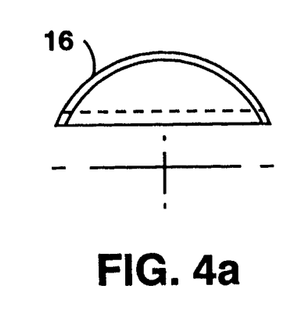
FIG. 4a is a left hand end view and FIG. 4b is a right hand end view of the wedge of FIG. 4.
Figure 4B:
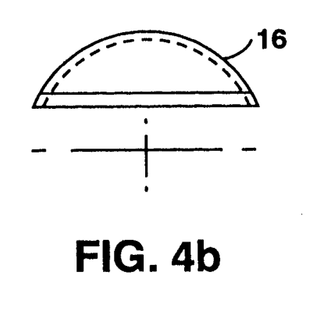

The stud 12 is fitted into through-holes 14a, 14'a formed in a pair of coupling flanges 14, 14'. The through-holes 14a, 14'a may be generally circular in shape. The flanges 14, 14' may be attached to, or they can be an integral part of, respective shafts that are to be coupled for transmitting a driving torque. A wedge 16 (also shown in FIGS. 4, 4a and 4b) is provided in the space between the upper tapered side of the stud 12 and the inner walls of the through-holes 14a, 14'a. As shown in FIGS. 4, 4a and 4b, the wedge 16 has a rounded upper side for engaging the inner walls of the through-holes 14a, 14'a and a lower tapered flat side. Right and left nuts 18, 18' (also shown in FIGS. 6 and 6a) at respective ends of the stud 12 are used to tighten and couple the flanges 14, 14' together. The nuts 18, 18' may preferably have counterbores 20, 20', which allow the wedge 16 to move during assembly as needed.

The diameter of the stud 12 and the wedge 16 may be equal to or slightly less than the diameter of the through-holes 14a, 14'a. Preferably, the stud 12 and the wedge 16 have diameters for a running-fit into the through-holes 14a, 14'a; a running-fit is a fit so that the stud 12 and the wedge 16 can pass through the through-holes 14a, 14'a while contacting the inner walls of the through holes 14a, 14'a. The taper on the stud 12 and the wedge 16 may be formed so as to have an angle $\alpha$ (as shown in FIGS. 3 and 4) in the range of 1.5°–12°, preferably in the range of 2°–10°, and more preferably in the range of 3°–5°. The degree of the taper will depend on the length of the stud 12, which in turn depends on the number of studs used to couple the flanges 14, 14' and the combined thickness of the flanges 14, 14'. Since the stud 12 and the wedge 16 each have a diameter that allows for a running-fit inside the through-holes 14a, 14'a, the wedging action of the wedge 16 is obtained by the wedge 16 riding up the taper formed on the stud 12, thereby forming a tight, force-fit in the space between the stud 12 and the inner walls of the through-holes 14a, 14'a as the wedge 16 is moved up the taper on the stud 12.

The stud 12 and the wedge 16 may be made of any suitable or desired material. For example, the stud 12 and the wedge 18 may be made of steel. Preferably, the wedge 16 may be made of a softer material than the stud 12 so as to provide better wedging action by the wedge 16.

As shown in FIG. 3, the stud 12 has a middle portion 30 connecting end portions 32, 34 that are threaded. Preferably, the middle portion 30 is not threaded. The threaded portion 32 of the stud 12, to the right of the middle portion 30, as shown in FIG. 3, has the same diameter as the middle portion 30. In contrast, the threaded portion 34, to the left of the middle portion 30, has a diameter greater than the diameter of the middle portion 30. The diameter of the threaded portion 34 to the left of the middle portion 30 is increased so as to allow installation of the wedge 16 and to allow a projection 28 of a wedge spacer 22 to be inserted into the space between the stud 12 and the inner wall 18'a of the left nut 18'.

The wedge spacer 22 (also shown in FIGS. 5 and 5a) pushes against the wedge 16 with the projection 28, as shown in FIG. 2, so as to tighten contact between the stud 12 and the inner walls of the through-holes 14a, 14'a. The objective of the wedge spacer 22 is to create and maintain tight contact between the wedge 16, the stud 12 and the inner walls of the through-holes 14a, 14'a. In a preferred embodiment, the wedge spacer 22 prevents loosening of the tight contact between the wedge 16, the stud 12 and the inner walls of the through-holes 14a, 14'a. It is, however, possible to force-fit the wedge 16 into the space between the stud 12 and the inner walls of the through-holes 14a, 14'a in such a manner that the wedge 16 is retained in the space in tight contact with the stud 12 and the inner walls of the through-holes 14a, 14'a. In such an instance, the wedge spacer 22 need not be provided. The wedge spacer 22 has a hexagonal outer periphery so that the wedge spacer 22 can be held by a wrench when a wedge nut 26 is tightened so as to press the projection 28 of the wedge spacer 22 against the wedge 16.

In the coupling stud assembly 10 shown in FIG. 2, the wedge nut 26 is tightened onto the threaded portion of the stud 12 after positioning the wedge spacer 22. The wedge nut 26 tightens the contact between the projection 28 of the wedge spacer 22 and the wedge 16 so as to tightly press the wedge 16 into the space between the stud 12 and the inner walls of the through-holes 14a, 14'a. Lock nuts 24, 24' are provided at each end of the stud 12 so as to lock the adjacent nuts 18, 26 in place to prevent them from loosening. The assembly in FIG. 2 shows all of the components of the coupling stud assembly 10 according to the first embodiment of the present invention, with the flanges 14, 14' that are coupled by the coupling stud assembly 10 in the center.

Figure 6:
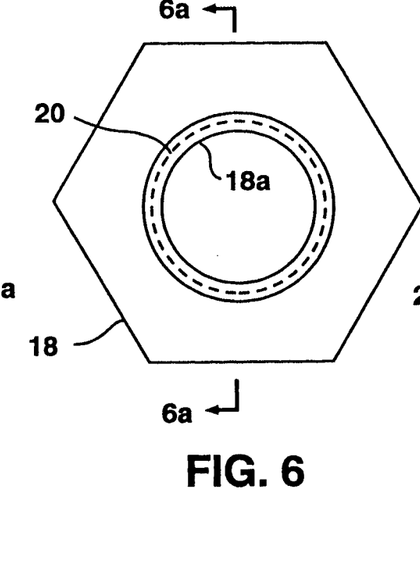
FIG. 6 is a front view of a nut of the embodiment in FIG. 2.
Figure 6A:
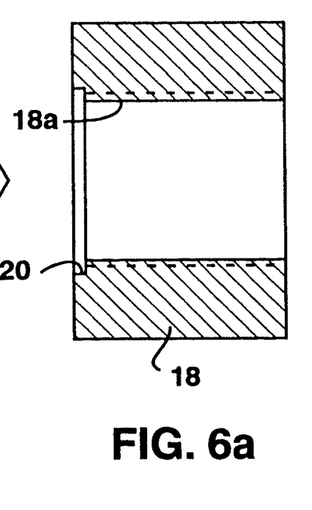
FIG. 6a is a cross-sectional view along lines 6a—6a of FIG. 6.

For assembly of the coupling stud assembly 10, the left nut 18' is screwed onto one end of the stud 12. The other end of the stud 12 is then inserted through the thorough-holes 14a, 14'a of the flanges 14, 14', and the right nut 18 screwed onto the other end of the stud 12. The nuts 18, 18' may preferably have two different inner diameters. The drawings of FIGS. 6, 6a show only one nut, which is a typical representation. The right and left nuts 18, 18' are then tightened sequentially to a desired tightness, which is determined by the driving torque transmitted by the driving shaft attached to one of the flanges 14, 14'.

Figure 8:
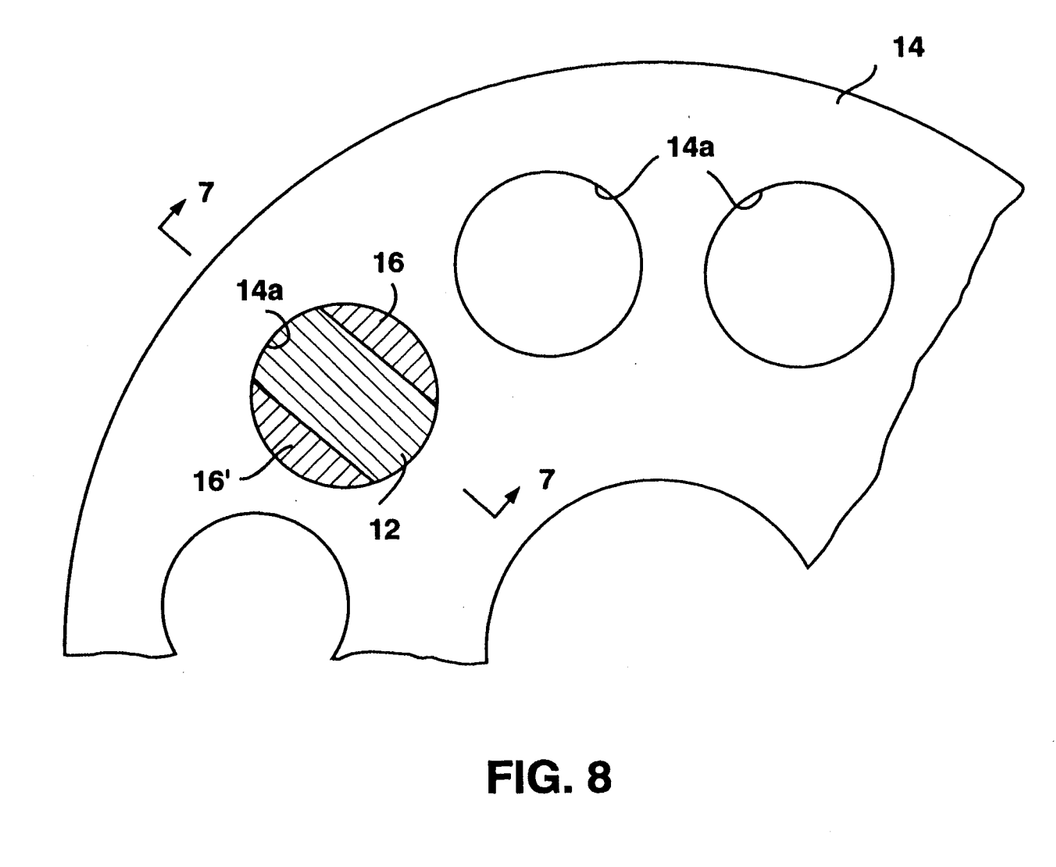
FIG. 8 is a partial front view of a coupled flange with the coupling stud assembly of FIG. 7 fitted in the flange.

After tightening the nuts 18, 18', the wedge 16 is inserted into the space defined between the tapered surface of the stud 12 and the inner wall of the through-hole 18'a of the left nut 18' and the inner walls of the through-holes 14a, 14'a in the flanges 14, 14'. To achieve maximum effectiveness the wedge 16 should be oriented with the interface between the wedge 16 and the stud 12 extending generally in the radial direction, as shown in FIG. 8, and not in the circumferential direction of the flanges 14, 14'. The wedge 16 is fitted into the space so that the upper circular side of the wedge 16 contacts the respective inner walls of the flanges (14, 14') and the lower tapered flat surface of the wedge 16 contacts the upper tapered surface of the stud 12.

Since the diameters of the stud 12 and the wedge 16 are such that a running-fit is formed in the respective through-holes (14a, 14'a and 18'a), the wedge 16 rides up the taper on the stud 12 till it fully occupies the space between the stud 12 and inner walls of the through-holes 14a, 14'a. The wedge spacer 22 is then mounted on the stud 12 so that the projection 28 presses against the wedge 16. The wedge nut 26 is then screwed onto the stud 12 and tightened to a desired tightness so as to maintain the wedge spacer 22 in position with the projection 28 pressing the wedge 16 into place in the space between the upper surface of the stud 12 and inner walls of the through-holes 14a, 14'a. After the wedge nut 26 has been tightened, the lock nuts 24, 24' may be screwed on each end of the stud 12 and tightened. The space between the left nut 18' and the wedge spacer 22 is intentional, and allows the wedge spacer 22 to be pushed against the wedge 16 as the wedge nut 26 and the locking nut 24' are tightened. The right and left lock nuts 24, 24' prevent the nuts 18, 18', 26 from loosening and, therefore, may be included in the coupling stud assembly so as to provide an added safety feature.

To undo the assembly, the lock nuts 24, 24' are removed first. Then the wedge nut 26 is turned ¼ of a turn at a time, while the wedge 16 is tapped from the other end, to prevent any seizing. The right and the left nuts 18, 18' are not unbolted until the wedge 16 becomes loose and is removed. Once the wedge 16 is removed then the stud 12 can be easily removed, since it has a running clearance within the through-holes 14a, 14'a in the flanges 14, 14'.

The first embodiment of the invention shown in FIGS. 2-6 has been found to have the following advantages: (a) The stud 12 can be tightened to meet any desired driving torque requirements accurately; (b) The stud 12 and the wedge 16 are tightened into contact with inside walls of the through-holes 14a, 14'a in the flanges 14, 14' so as to prevent slippage between the respective flange faces; (c) The component parts are easily made, and because of new fine wire cutting (0.009–0.014″ wide cut) technology, the stud 12 and wedge 16 can be cut from a single stock, after the threads are machined onto the stock; (d) The coupling stud assembly 10 can be easily installed and removed from the through-holes 14a, 14'a in the flanges 14, 14'; and (e) The nuts 18, 18' are made longer so as to provide additional grip to compensate for the material removed from the stud 12, as shown in FIG. 3.

Figure 5:
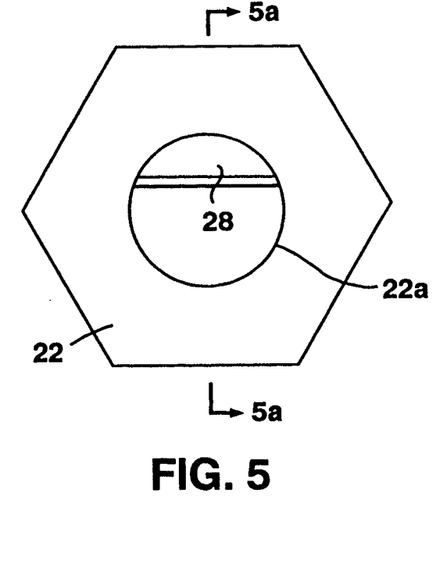
FIG. 5 is a front view of a wedge spacer of the embodiment in FIG. 2.
Figure 5A:
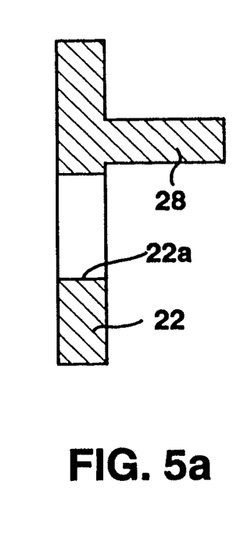
FIG. 5a is a cross-sectional view along lines 5a—5a of FIG. 5.
Figure 7:
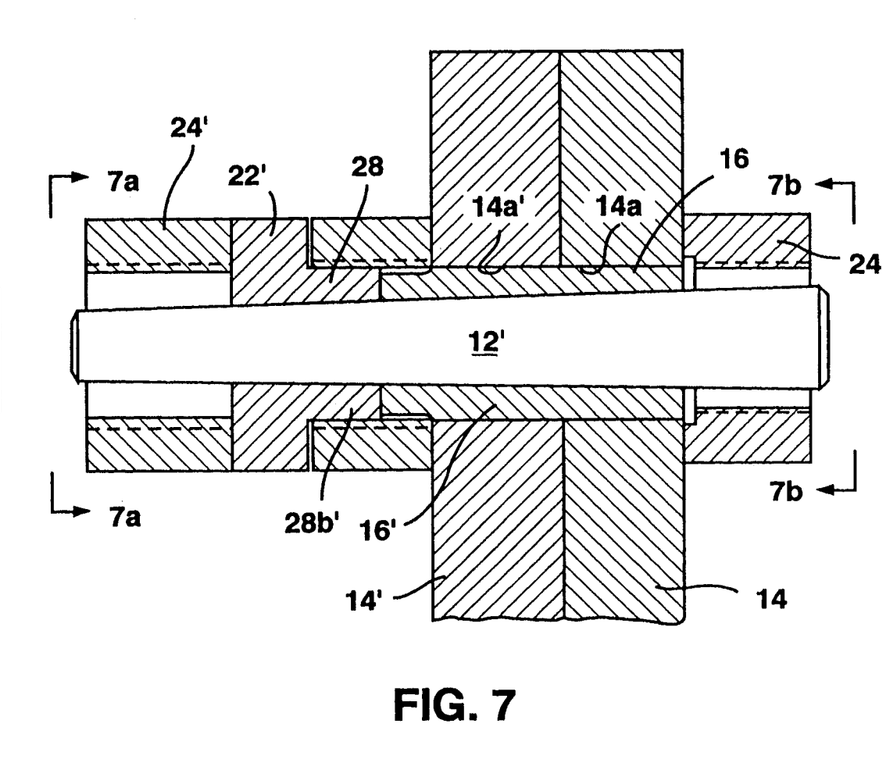
FIG. 7 is a cross-sectional view of a coupling stud assembly according to a second embodiment of the present invention.
Figure 7A:
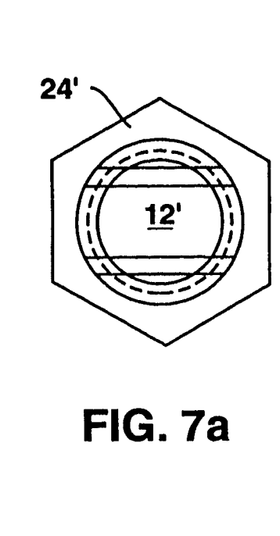
FIGS. 7a and 7b are respective end views along lines 7a—7a and 7b—7b of the coupling stud assembly of FIG. 7.
Figure 7B:
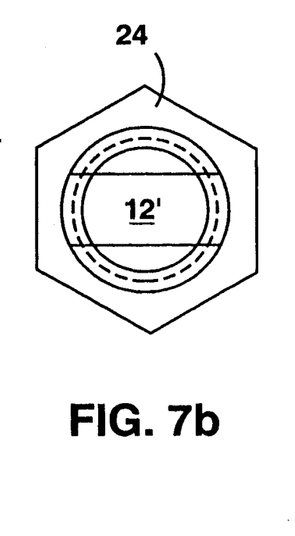

A second embodiment of the invention is shown in FIG. 7. This embodiment has the same applicability and functions as the embodiment shown in FIG. 2. A stud 12' has two tapered sides 180 degrees apart, and uses two wedges 16, 16' symmetrically positioned so as to provide a tight fit in the through-holes 14a, 14'a of the flanges 14, 14'. A wedge spacer 22' having two projections 28, 28', instead of one as shown in FIG. 5, is provided so as to tighten the wedges 16, 16' in the spaces between the stud 12' and the inner walls of the through-holes 14a, 14'a.

Unlike the first embodiment, shown in FIGS. 2–6, there is a trade-off due to symmetry in the tapered stud 12' of FIG. 7. To assure proper torque transmission the thread requirement and the bolt diameter have to be increased to meet the desired criteria.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A coupling stud assembly for coupling a pair of flanges, the flanges having a pair of respective overlapping generally cylindrical holes formed therein for receiving the stud assembly, the stud assembly comprising:

a stud;

first retaining means for retaining the stud in the holes so as to couple the flanges;

the stud being shaped and sized for defining a space between the stud and inner walls of the holes;

at least one wedging member shaped and sized for fitting into the space between the stud and the inner walls of the holes so as to tighten contact between the stud and the inner wails of the respective overlapping holes of the flanges; and second retaining means for retaining and forcing the wedging member into the space between the stud and the inner walls of the holes thereby forming a tight, force-fit between the stud, the wedging member and the inner walls of the holes.

2. The coupling stud assembly of claim 1, wherein the second retaining means includes a spacing member for forcing the wedging member into the space between the stud and the inner walls of the holes, and a retaining member for fitting on one end of the stud so as to press the spacing member into contact with the wedging member.

3. The coupling stud assembly of claim 2, wherein the retaining member comprises a hexagonal-shaped disk, the hexagonal-shaped disk having a hole formed therein for receiving the stud; and the spacing member comprises a projection extending from one face of the disk so that when the stud passes through the hole in the hexagonal disk the projection extends toward the wedging member so as to contact the wedging member fitted into the space between the stud and the inner walls of the holes.

4. The coupling stud assembly of claim 3, wherein the retaining member and the spacing member are combined into one piece, a third retaining means provided on the stud so as to retain the retaining member at a fixed position on the stud thereby maintaining the projection in contact with the wedging member fitted into the space.

5. The coupling stud assembly of claim 1, wherein the stud is generally elongate in shape and has a length sufficient to extend through the respective overlapping holes of the flanges with ends of the stud projecting therefrom;

the first retaining means being provided on the respective ends of the stud;

one side of the stud being tapered so that when the stud is inserted in the overlapping holes of the flanges the space is defined between the tapered side of the stud and the inner walls of the respective overlapping holes.

6. The coupling stud assembly of claim 5, wherein the stud has threads formed at respective ends of the stud;

an upper side of the stud being tapered, the taper on the upper side extending from one end of the stud toward the other end along substantially the length of the stud so that the wedging member can be inserted into the space between the stud and the inner walls of the holes from the other end of the stud after the first retaining means are provided on the respective ends of the stud;

a middle portion of the stud being without threading, a portion of the stud extending from the middle portion to the other end of the stud having a diameter greater than a diameter of the remaining portion of the stud.

7. The coupling stud assembly of claim 1, wherein the wedging member for fitting into the space between the stud and the inner walls of the holes is a wedge, one face of the wedge being generally circular in shape with another opposite face of the wedge being tapered, the taper on the wedge extending from one end of the wedge to the other.

8. The coupling stud assembly of claim 7, wherein the taper on the wedge matches a taper on the stud.

9. The coupling stud assembly of claim 1, wherein both the stud and the wedging member have a taper, the taper on the stud and the wedging member being in the range of 2°–10°.

10. The coupling stud assembly of claim 9, wherein the taper is in the range of 3°–5°.

11. The coupling stud assembly of claim 1, wherein the first retaining means comprises a pair of nuts, one of the pair of nuts being attached to each end of the stud so as to couple the flanges.

12. A coupling stud assembly for coupling a pair of flanges, the flanges having a pair of respective overlapping generally cylindrical holes formed therein for receiving the stud assembly, the stud assembly comprising:

a stud;

first retaining means for retaining the stud in the holes so as to couple the flanges;

the stud being shaped and sized for defining a first and a second space between the stud and the inner walls of the holes;

two wedging members shaped and sized for fitting into the first and second space, respectively, so as to tighten contact between the stud and inner walls of the respective overlapping holes of the flanges; and an upper and a lower side of the stud being tapered so that the two tapered sides are 180° apart, the taper on the upper and the lower sides extending from one end of the stud toward the other end along substantially the length of the stud so that the two wedging members can be inserted into the first and second space, respectively, from the other end of the stud after the first retaining means are provided on the respective ends of the stud.

13. The coupling stud assembly of claim 12, wherein the stud has threads formed at respective ends of the stud;

a middle portion of the stud being without threading, a portion of the stud extending from the middle portion to the other end of the stud having a diameter greater than a diameter of the remaining portion of the stud; and further including second retaining means for retaining and forcing the two wedging members into the first and second space, respectively, between the stud and the inner walls of the holes thereby forming a tight, three-fit between the stud, the wedging members and the inner walls of the holes.

14. A method for coupling a pair of flanges, the flanges having a pair of respective overlapping holes formed therein for receiving a coupling stud assembly, the method comprising the steps of:

(a) providing a stud generally elongate in shape and having a length sufficient to extend through the respective overlapping holes of the flanges with ends of the stud projecting therefrom; the stud being shaped and sized for defining at least a space between the stud and inner walls of the holes;

(b) retaining the stud in the overlapping holes by a first retainer so as to couple the flanges;

(c) fitting at least one wedging member shaped and sized for fitting into the space between the stud and the inner walls of the holes;

(d) positioning a second retainer for retaining and forcing the wedging member into the space between the stud and the inner walls of the holes; and (e) retaining the second retainer in contact with the wedging member by a third retainer so as to tighten contact between the stud and the inner walls of the respective overlapping holes of the flanges.

15. In combination, a pair of shafts having respective flanges, the shafts being substantially collinear and the respective flanges being substantially parallel and facing each other for being coupled together; and a coupling stud assembly for coupling the respective flanges, the flanges having a pair of respective overlapping generally cylindrical holes formed therein for receiving the stud assembly, the stud assembly comprising:

a stud;

first retaining means for retaining the stud in the holes so as to couple the flanges;

the stud being shaped and sized for defining a space between the stud and inner walls of the holes; and at least one wedging member shaped and sized for fitting into the space between the stud and the inner walls of the holes so as to tighten contact between the stud and the inner walls of the respective overlapping holes of the flanges; and second retaining means for retaining and forcing the wedging member into the space between the stud and the inner walls of the holes thereby forming a tight, force-fit between the stud, the wedging member and the inner walls of the holes.

* * * * *